United States Patent [19]

Giesler et al.

[11] Patent Number: 5,044,401
[45] Date of Patent: Sep. 3, 1991

[54] INTEGRAL VALVE AND SEAL FOR A QUICK CONNECT COUPLING

[75] Inventors: Dennis C. Giesler, Maple Grove; Lowell R. Hanson, Cedar, both of Minn.

[73] Assignee: Parker Hannifin Corporation, Cleveland, Ohio

[21] Appl. No.: 615,946

[22] Filed: Nov. 20, 1990

[51] Int. Cl.⁵ .............................................. F16L 29/00
[52] U.S. Cl. .............................. 137/614.03; 251/149.2
[58] Field of Search .................. 137/614.03; 251/149.2

[56] References Cited

U.S. PATENT DOCUMENTS

| | | | |
|---|---|---|---|
| 1,241,352 | 9/1917 | Doering et al. | 251/149.2 X |
| 1,491,986 | 4/1924 | Greene | 251/149.2 X |
| 2,492,271 | 10/1946 | Cox et al. | |
| 2,789,838 | 4/1957 | Palm | 251/149.2 X |
| 4,296,914 | 10/1981 | Albread | 251/149.2 |
| 4,877,219 | 10/1989 | Yano | 251/149.2 |

Primary Examiner—John C. Fox
Attorney, Agent, or Firm—Leonard L. Lewis

[57] ABSTRACT

The combination of a quick connect fluid coupling having a nipple assembly axially connectable with a coupler assembly, and an integral valve and seal member made of an elastomeric material. The integral valve and seal member closes the nipple assembly when the quick coupling is disconnected and opens the nipple assembly to fluid flow when the quick coupling is made up. The nipple assembly has axially interfitted male and female parts that capture the integral valve and seal member between two shoulders when the male and female parts are mated. The nipple assembly also has a hollow nipple probe that inserts into a portion of the coupler assembly. The integral valve and seal member has an annular body seal portion that seals the interfitted nipple male and female parts, and a smaller diameter valve disk concentrically connected to the annular seal portion by a flexible hinge portion. The valve disk seals against a flange in the nipple assembly. The coupler assembly includes an interface seal and a coupler probe that opens the valve disk after the nipple probe has sealingly contacted the interface seals as the nipple and coupler assemblies are engaged. Means are provided to releasably lock the nipple and coupler assemblies together, and a second valve mechanism can be provided in the coupler assembly that opens either before or after the integral valve and seal member is displaced.

33 Claims, 3 Drawing Sheets

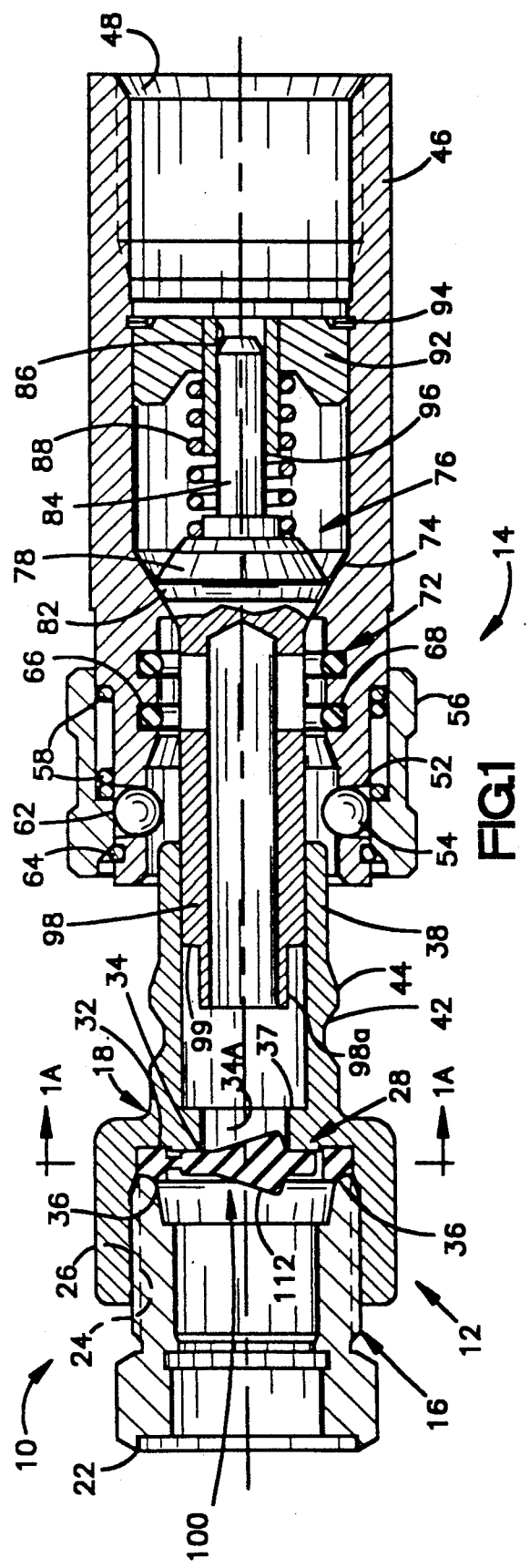
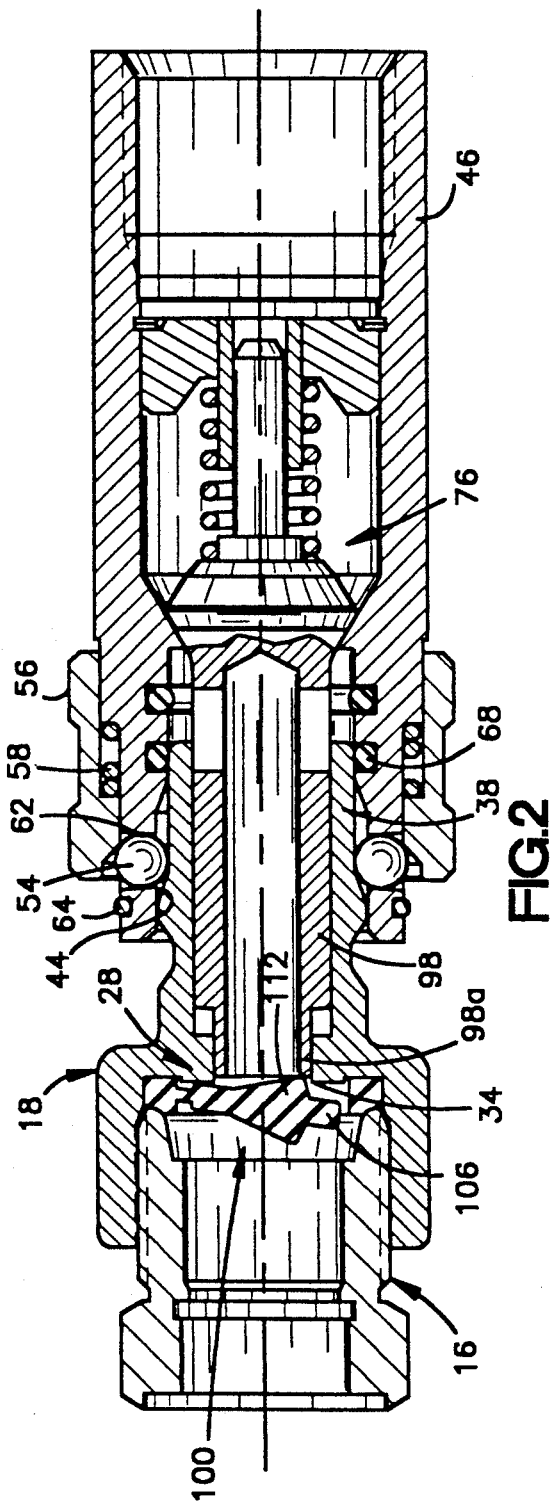

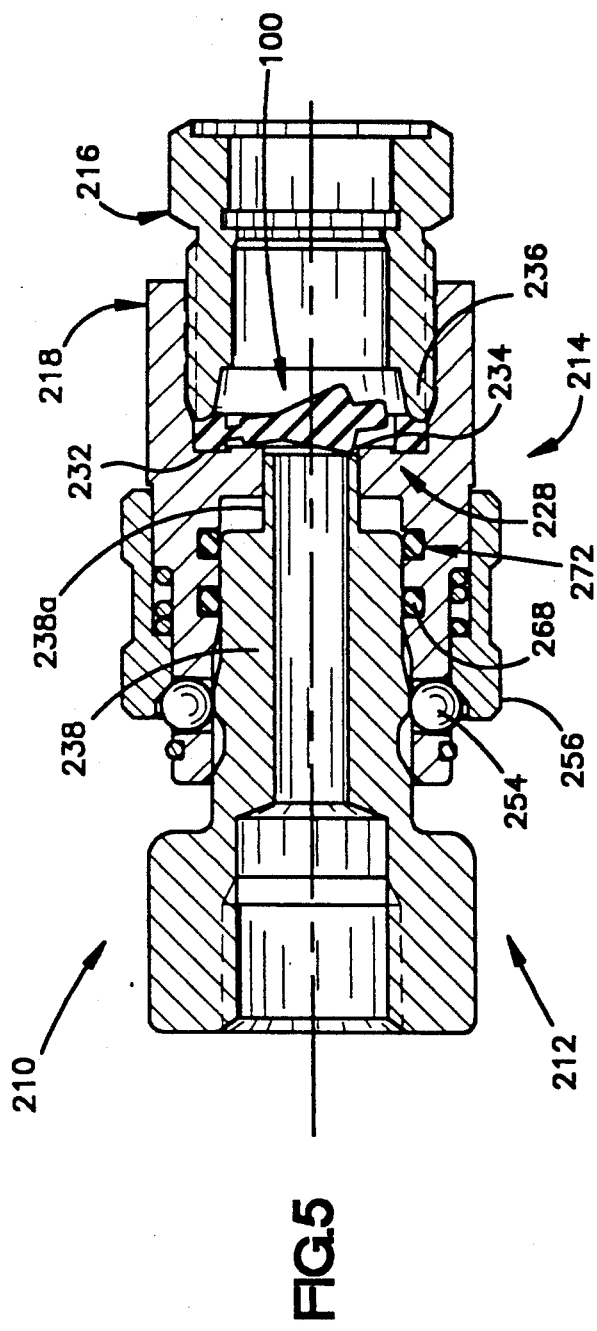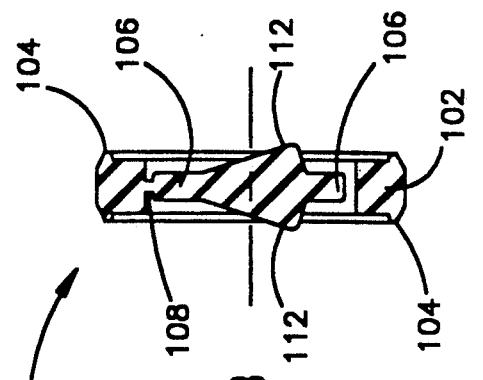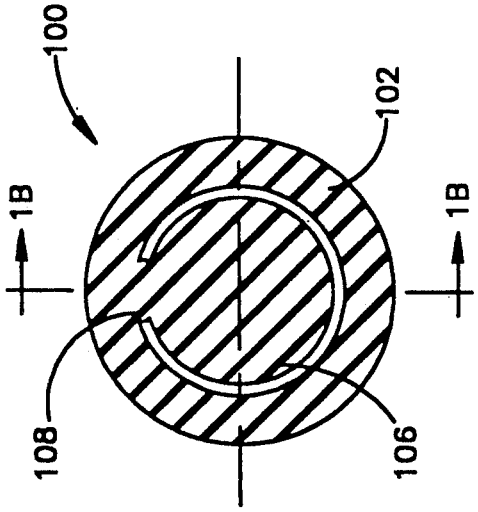

INTEGRAL VALVE AND SEAL FOR A QUICK CONNECT COUPLING

BACKGROUND OF THE INVENTION

The present invention relates generally to quick connect and disconnect fluid couplings. More particularly, the invention relates to quick couplings that can be connected under pressure with minimal loss of fluid. The terms "quick coupling" and "quick connect coupling" are used herein as synonyms.

Quick connect couplings are particularly useful and well-known in the fluid handling art. For example, quick connect couplings are commonly used to join two or more hose sections together in a fluidtight manner. The coupling halves typically are designed to mateably lock together using a ball and detent mechanism that is secured by a spring-loaded sleeve, but the coupling can also be separated by a fairly small longitudinal force being applied to the sleeve.

When the coupling halves are unmated, either or both halves may be connected to fluid under pressure via the attached hose. Consequently, numerous designs for valve mechanisms have been proposed to prevent fluid transfer until the coupling halves are mated. Typically, each valve mechanism uses several parts including a valve member, a valve seat, one or more springs, body seals and valve seals. All of these parts must be carefully made to insure a good fluidtight seal under pressure. The large number of parts adds to the manufacturing material and labor costs, plus it can reduce the overall reliability of the coupling. Field repair of these valve mechanisms is also complicated, time consuming, and costly. While the various valve designs used commercially heretofore are generally acceptable in preventing leaks, the need has long existed for a simple, inexpensive and reusable valve mechanism for quick connect couplings.

SUMMARY OF THE INVENTION

The present invention contemplates a valving mechanism embodied in a single integral device that functions as a valve, valve spring, valve seal and body seal. This integral device is suited for use in any conventional valved or unvalved quick coupling of the type having a male nipple or stem assembly releasably connectable with a female coupler assembly.

According to one aspect of the invention, an integral valve and seal device is made of an elastomeric material such as nitrile rubber, and may be molded by a conventional process such as injection molding or compression molding. The seal rubber compound is selected for predetermined compression seal characteristics and resistance to degradation from caustic fluids.

The invention contemplates an integral valve and seal device adapted to fit at the interface between two axially interfitted parts of either the nipple assembly, the coupler assembly or both. According to this aspect of the invention, the integral valve and seal device includes a peripheral seal portion that functions as a body seal at the interface of the two interfitted parts.

The present invention further contemplates an integral valve and seal device in which the valve is a hinged disk portion connected to the body seal portion and that sealingly seats against a part of the coupling assembly. According to this aspect of the invention, the hinged valve portion provides both the valve function and the valve seal function. The valve provides a positive seal against fluid leakage, and also serves as a dust protector when the coupling assembly is not pressurized.

Still another aspect of the invention is the hinged connection between the valve portion and the body seal portion. The hinged connection maintains the valve in a normally closed position, acting in place of a valve closure spring. The valve portion also includes an axial rib that initially engages an opening mechanism to reduce stress on the hinge when the quick connect coupling is made up.

These and other aspects of the present invention will be readily appreciated by those skilled in the art from the following detailed specification in view of the accompanying drawings.

BRIEF DESCRIPTION OF THE DRAWINGS

FIG. 1 shows in longitudinal cross-section, an integral valve and seal device in a quick connect coupling in accordance with the present invention, in this example with the integral valve and seal device being located in the male coupling assembly; the quick connect coupling is shown in an unconnected condition;

FIG. 1A is a lateral cross-section along the line A—A in FIG. 1, of an integral valve and seal device according to the present invention;

FIG. 1B is a side view in cross-section of a valve and seal device according to the present invention;

FIG. 2 is the quick coupling of FIG. 1 shown at an intermediate position in which the coupling assemblies are partially engaged but not locked;

FIG. 5 is an alternative embodiment in which the quick coupling has only one valve mechanism; in this example the integral valve and seal device is located in the female coupling assembly.

DESCRIPTION OF PREFERRED EMBODIMENTS

Figure 3:
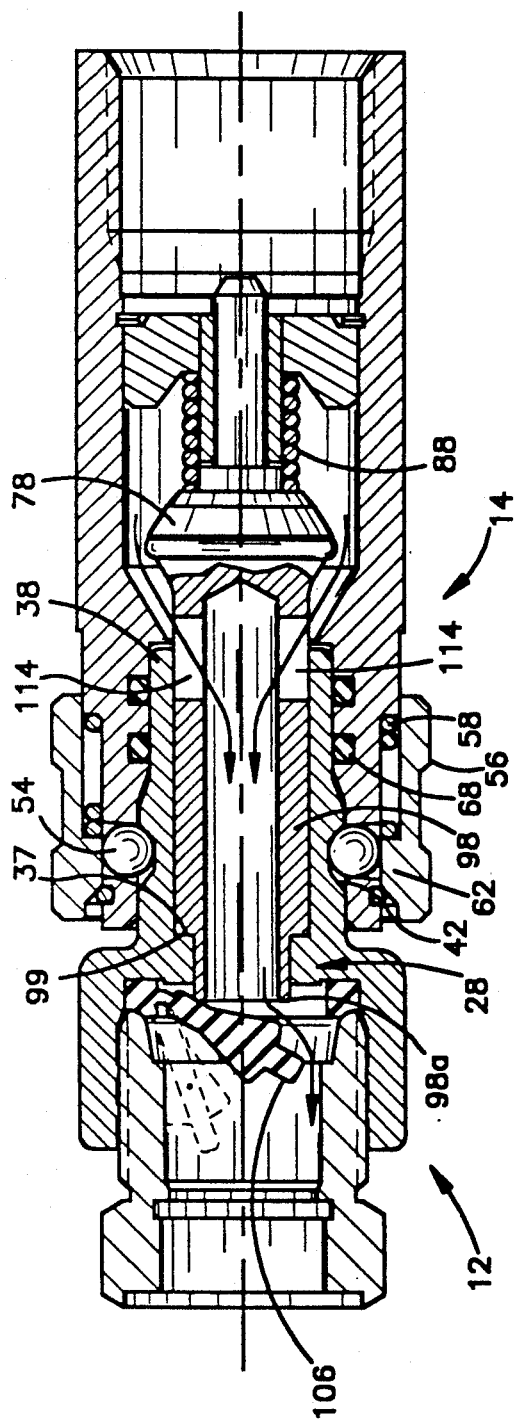
FIG. 3 shows the quick coupling of FIG. 1 with the coupling assemblies fully engaged and locked.

With reference to FIG. 1, according to the present invention, a quick connect coupling 10 is provided with an integral valve and seal device 100 in one of the quick connect coupling assemblies. In particular, the quick coupling 10 includes a male nipple or stem assembly 12 that axially mates with a female coupler assembly 14. In the embodiment represented in FIGS. 1-4, each coupling assembly 12, 14 has a valve mechanism, with the integral valve and seal device 100 being the valve mechanism located in the nipple assembly 12. Those skilled in the art, however, will readily appreciate that the integral valve and seal device 100 can also be used as the valve mechanism in each coupling assembly 12, 14 or can be used in only one of the coupling assemblies, as will be explained hereinafter with reference to FIG. 5. These embodiments, therefore, are only intended to be exemplary in nature to demonstrate the general use of the integral valve and seal device in a quick connect coupling.

Still referring to FIG. 1, the quick coupling male nipple assembly 12 includes two axially interfitted parts. These parts are a male fitting 16 and a female fitting body 18. The male fitting 16 may be any conventional fitting having an outer end 22 that can be attached to hose, tubing, piping or other fluid retainers in a fluid handling system. The male fitting 16 also as an externally threaded end 24 that mates up with an internally threaded cylinder 26 that is part of the female body 18.

The female body 18 further includes a radially inward flange 28. The flange 28 has an annular recess 32 that is radially spaced from the innermost face 34 of the flange 28. The flange 28 also forms an inner probe stop 37 that is axially spaced from the flange face 34.

The recessed flange portion 32 provides a seal shoulder that axially opposes a second seal shoulder 36 formed by the inner end of the male fitting 16. When the male fitting 16 and female body 18 are made up, the opposing shoulders 32, 36 are axially spaced from each other and form an annular groove therebetween.

The nipple assembly 12 further includes a hollow, longitudinal probe or stem 38. The nipple probe 38 is provided with a peripheral ball detent groove 42 and locking rib 44.

Turning next to the coupler assembly 14, this assembly includes a hollow cylindrical body 46 that can be attached at one end 48 to fittings, hose, pipes or other fluid retainers in any fluid handling system.

At the coupling end of the assembly 14, the coupler body 46 has a plurality of radially tapered holes 52. Each hole 52 loosely retains a locking ball 54. The holes 52 taper to a radially innermost diameter that is less than the respective ball diameter so that when the nipple and coupler assemblies 12, 14 are unmated the balls 54 cannot drop out of the holes 52 into the body 46.

The coupler assembly 14 also has a cylindrical locking sleeve 56 adapted to slide over the coupling end of the body 46. The locking sleeve 56 is axially biased by a spring 58 that urges the sleeve 56 to a position shown in FIG. 1 at which an inner portion 62 of the sleeve 56 traps the balls 54 in their respective holes 52. A snap ring 64 prevents the sleeve 56 from sliding off the coupler body 46.

With the locking sleeve 56 in the position depicted in FIG. 1, the nipple probe 38 cannot be inserted into the coupler 14 because the probe rib 44 will interfere with the trapped balls 54 which cannot move radially outward due to the sleeve 56.

The coupler body 46 includes an inner seal groove 66 that retains an elastomeric interface seal member 68 such as an o-ring. A second redundant groove and interface seal 72 may also be provided.

The coupler body 46 is provided with an axially tapered bore 74 that functions as a valve seat for a poppet valve assembly 76. The poppet valve assembly 76 has a valve 78 that holds a valve seal 82. A valve stem 84 extends axially from the valve 78 and slidably inserts in a valve stem bushing 86. A spring 88 urges the poppet valve to a normally closed position as depicted in FIG. 1. The valve bushing 86 is axially retained in the coupler body 46 by a plurality of centering fins 92 that engage a valve retaining ring 94. The bushing end 96 that faces the valve 78 is axially spaced therefrom to engage and stop axial movement of the poppet valve before the spring 88 can be fully compressed whenever the poppet valve is forced open, as will be explained hereinafter.

The valve assembly 76 also includes a hollow axial coupler probe 98 that is sized to slidably insert into the hollow nipple probe 38. The coupler probe 98 has a reduced diameter nose 98a that is sized to slidably insert into the axial bore or orifice 34a defined by the female flange 34. The step down diameter nose 98a forms a coupler probe shoulder 99.

An integral valve and seal device 100 is captured in the nipple assembly 12 by the interfitted male fitting 16 and female body 18. The integral device 100 is preferably made of a suitable elastomeric material such as nitrile. The device can be molded by any conventional process such as injection or compression molding. With additional reference to FIGS. 1A and 1B, the integral valve and seal device 100 has an annular peripheral body seal portion 102 sized to be captured and compressed between the opposing seal shoulders 32, 36 when the male and female fittings 16, 18 are made up by threaded engagement. Preferably, the body seal portion 102 seats in the recess 32. The annular body seal 102 may also include a bead 104 about its outer periphery to improve the compression and seal of the device 100. The annular body seal functions similar to an o-ring in the sense that it provides a fluidtight seal at the interface of the interfitted fitting 16 and body 18.

The valve and seal device 100 further includes a valve disk 106 that is somewhat less in diameter than the inner perimeter of the body seal portion 102, but greater in diameter than the orifice 34a diameter. The disk 106 is concentrically positioned with respect to the annular seal 102 and is flexibly attached to the annular seal 102 with a small hinge piece 108 of the elastomeric material. The hinge is, of course, preferably formed during the same mold process used to form the annular seal 102 and valve disk 106.

The cross-sectional thickness of the valve disk 106 is preferably slightly less than the thickness of the annular seal 102 so that when the annular body seal 102 is captured in the nipple assembly recess 32, the valve disk 10 abuts the inner flange face 34 thus sealing off the orifice 34a. The thickness of the hinge piece 108 is preferably less than the disk 106 thickness to increase flexibility.

The disk 106 serves both as a moveable valve that can pivot about the hinge 108, as well as the valve seal such that when the disk 106 is in contact with the flange 34 the nipple assembly 12 is sealed. When the nipple assembly is connected to pressurized fluid, the back pressure on the disk 106 will push the valve disk 106 into sealing engagement with the flange face 34 and thus the valve 106 prevents fluid leakage. If the nipple assembly is at ambient pressure, the resilience of the hinge 108 will keep the valve disk 106 in contact with the flange face 34 so that the disk acts as a dust cover.

The integral valve and body seal 100 also includes an axially protruding rib 112 which may be formed on either face of the disk 106. The rib 112 is preferably located in a diametrically opposite position from the hinge 108.

Operation of the quick coupling 10 will next be explained, with particular reference to FIGS. 1-3.

FIG. 1 represents the nipple and coupler assemblies 12, 14 at initial axial engagement with the coupler probe 98 partially inserted into the nipple probe 38. Further insertion under these conditions is prevented by the locking balls 54 interfering with the nipple probe rib 44.

In order to completely make up the coupling 10, the user applies an axial force to the locking sleeve 56, overcoming the force of the spring 58 so as to slide the sleeve 56 to approximately the position depicted in FIG. 2. This causes the lock portion 62 of the sleeve 56 to no longer restrain radial movement of the balls 54. As the nipple assembly 12 is further pushed into the coupler assembly 14, the nipple probe rib 44 pushes the balls 54 radially outward.

As shown in FIG. 2, the coupler probe nose 98a initially engages the disk rib 112 on the integral valve and seal device 100 but only after the nipple probe 38 has sealingly engaged at least one of the interface seals 68. Further coupling movement of the nipple and coupler assemblies 12, 14 towards each other results in the coupler probe nose 98a axially pushing the valve 106 out of sealing contact with the nipple flange 34 as by pivoting about the hinge 108. The initial position where the valve 106 is opened is represented in FIG. 2.

As the nipple and coupler assemblies 12, 14 approach a fully engaged position, the valve 106 is pushed more fully open as represented in FIG. 3. The coupler probe nose 98a subsequently has engaged the face of the disk 106 near the hinge 108, but the stress on the hinge has been reduced because the valve disk 106 has already partially opened. As shown in phantom in FIG. 3, the valve disk 106 can be completely opened by proper selection of the axial length of the probe nose 98a, or the disk 106 can fully open under force exerted by fluid flow pressure when the direction of fluid flow is in the disk opening direction.

The coupler probe nose 98a is inserted into the nipple probe 38 until the probe shoulder 99 contacts the probe stop 37 on the flange 28. Further coupling action causes axial force to be exerted on the coupler probe 98 and hence the poppet valve 78 against the force of the bias spring 88. Therefore, as the nipple and coupler assemblies 12, 14 are fully engaged as shown in FIG. 3, the poppet valve 78 is also fully opened. A plurality of radial ports 114 are provided in the coupler probe 98 so that fluid can flow between the poppet valve opening and the nipple assembly 12 via the coupler probe 98, as represented by the broken flow arrows. Of course, fluid can flow in the opposite direction as well.

Upon full engagement, the locking balls 54 drop into the nipple probe detent 42, and the spring 58 snaps the sleeve 56 back into the lock position so that the nipple and coupler assemblies are firmly connected together.

The disconnect procedure is easily accomplished by the operator pulling the sleeve 56 back against the force of the spring 58 and out of engagement with the balls 54. The nipple assembly 12 can then be easily axially separated from the coupler assembly 12. As the nipple probe 38 slides out of the coupler assembly 14, the poppet valve spring 88 closes the poppet valve mechanism 76 and the integral valve and seal device 100 closes the nipple assembly 12 before the nipple probe 38 loses sealing contact with the interface seal 68.

It will be appreciated that during both the connect and disconnect operations a fluidtight connection is always maintained even if either the nipple assembly 12 or coupler assembly 14 is under pressure. This is because the nipple probe 38 is always in sealing contact with the interface seal 68 before either the poppet valve 78 opens or the integral valve and seal device 100 opens. Also, stress on the hinge 108 is reduced by having the probe nose 98a initially contact the rib 112 to open the valve 106.

Figure 4:
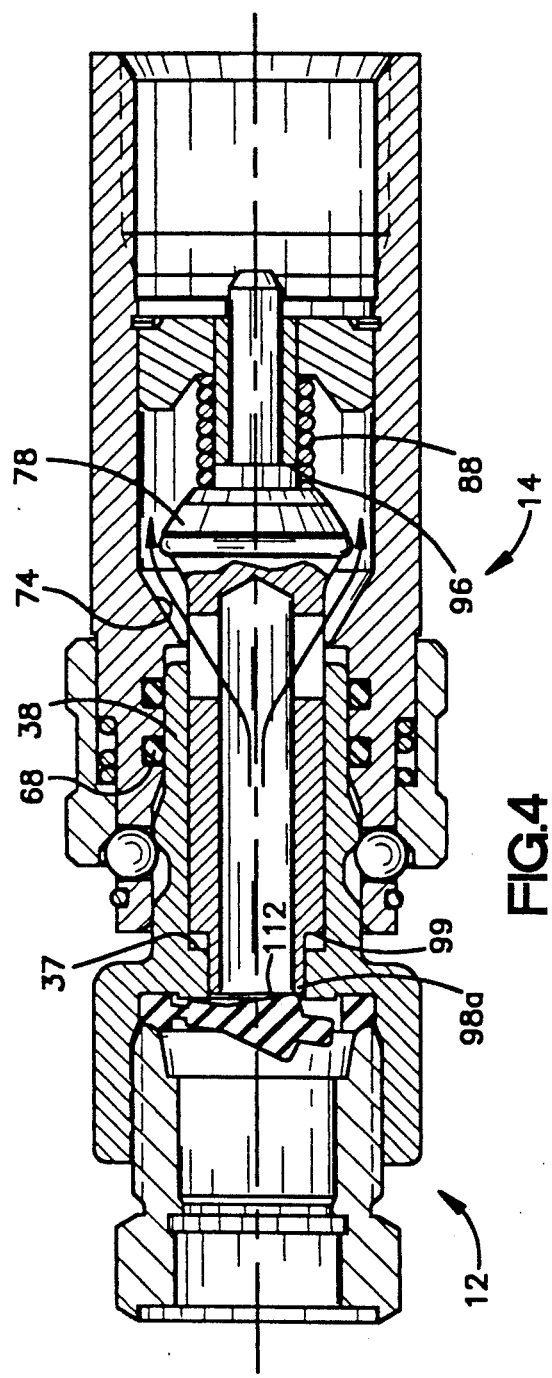
FIG. 4 shows the quick coupling of FIG. 1 near full engagement with the integral valve and seal device partially unseated after being initially held closed by back pressure, such that a second valve mechanism in the female coupler opens before the integral valve and seal device.

Operation of the quick coupling as shown in FIGS. 1-3 is particularly useful when the fluid pressure in the coupler assembly 14 is greater than the pressure in the nipple assembly 12. However, as represented in FIG. 4, the quick coupling 10 also advantageously works when the back pressure on the valve disk 106 exceeds the force exerted by the spring 88 holding the poppet valve 78 closed. In this circumstance, as the nipple and coupler assemblies 12, 14 are made up in the manner described hereinabove, the coupler probe nose 98a initially contacts the valve disk rib 112 after the nipple probe 38 is sealed by the interface seal 68. However, the back pressure on the valve disk 106 prevents the nipple valve disk 106 from initially opening. Rather, the coupling force causes the poppet valve 78 to open first. The poppet valve 78 is pushed axially away from the poppet valve seat 74 until the poppet valve 78 contacts the bushing end stop 96. Thereafter, the coupling force pushing the nipple and coupler assemblies 12, 14 together causes the nipple probe 38 to further insert into the coupler 14 so that the coupler probe nose 98a opens the nipple valve 106 in the manner described hereinbefore. This is the position shown in FIG. 4. Thereafter, the nipple and coupler assemblies are again locked together in a fluidtight manner.

The operation depicted in FIG. 4 is useful, for example, when the nipple assembly 12 is connected to a pressurized system and the user wants to vent the back pressure without loss of fluid. By opening the poppet valve first, the nipple valve 106 is then opened to vent the system.

FIG. 5 represents an alternative embodiment for using the integral valve and seal device 100 in a single valve coupling 210. In this embodiment, the integral valve and seal device 100 is positioned in the coupler assembly 214. The coupler assembly 214 includes a threaded male fitting 216 and a threaded female body 218. The interface of the female body 218 and male fitting 216 is substantially the same as in FIG. 1, such that a flange 228 provides a recessed seal shoulder 232 and a radially inwardly spaced flange face 234. As in the explanation of FIG. 1, the integral valve and seal device 100 is captured between the female body flange 228 and the inner end 236 of the male fitting 216.

The coupler assembly 214 also includes the interface seals 268, 272 and locking balls 254 and sleeve 256 as described hereinbefore. The nipple assembly 212 includes an axial nipple probe 238 that slidably inserts into the coupler assembly 214. The nipple probe 238 has a reduced diameter nose portion 238a that engages and displaces the integral valve and seal device 100 after the nipple probe 238 sealingly contacts the interface seal 268, as in the position depicted in FIG. 5.

The integral valve and seal device 100 contemplated by the present invention provides a very low cost valve and body seal as compared to conventional quick coupling valves. It obviates the use of special valve seats, springs and seals that add to the manufacturing material and assembly costs, as well as reduce the reliability of such prior valves. The device 100 works in any conventional quick connect assembly and can operate in association with conventional coupling valves such as poppet or ball valves.

While the invention has been shown and described with respect to a particular embodiment thereof, this is for the purpose of illustration rather than limitation, and other variations and modifications of the specific embodiments herein shown and described will be apparent to those skilled in the art within the intended spirit and scope of the claimed invention.

What is claimed is:

1. In a quick connect coupling of the type having a nipple assembly connectable with a coupler assembly and at least one of the coupling assemblies having axially mateable male and female parts, the female part having an inward flange providing a shoulder axially spaced from an inner end of the male part when the male and female parts are made up, and the other coupling assembly having an axial probe that inserts into the one coupling assembly towards said female shoulder as the nipple and coupler assemblies are connected, the improvement comprising: an integral valve and body seal made of an elastomeric material and having a peripheral body seal portion captured between the female shoulder and male inner end when the male and female parts are mated, and a hinged valve portion that seats against the female shoulder when the nipple and coupler assemblies are unconnected and that is axially displaced from the shoulder by the probe when the nipple and coupler assemblies are connected.

2. An integral valve and body seal according to claim 1 wherein said peripheral body seal portion is an annular seal compressed at the interface of the mated male and female parts, and said valve portion is a disk concentrically positioned with respect to said annular peripheral body seal and connected thereto by a hinge.

3. An integral valve and body seal according to claim 2 wherein said hinge is a small piece of said elastomeric material, which flexibly connects said disk with said annular body seal portion.

4. An integral valve and body seal according to claim 3 wherein the female shoulder has an annular recess radially spaced from a radial inner end of the shoulder, said recess being axially opposite the male inner end when the male and female parts are mated up and being sized to receive said annular body seal, said disk being axially thinner than said annular body seal.

5. An integral valve and body seal according to claim 4 wherein said hinge is axially thinner than said disk.

6. An integral valve and body seal according to claim 2 wherein said disk includes an axially protruding rib generally opposite said hinge that initially contacts the probe as the nipple and coupler assemblies are connected.

7. An integral valve and body seal according to claim 2 wherein said disk provides a fluidtight seal against the female shoulder when the one coupling assembly is unconnected from the other coupling assembly and is pressurized.

8. An integral valve and body seal according to claim 7 wherein said disk, annular seal and hinge are integrally formed from a molded elastomer such as nitrile.

9. In combination, a quick connect coupling having a nipple assembly axially connectable with a coupler assembly, and an integral elastomeric valve and body seal in the nipple assembly that sealingly closes the nipple assembly when the nipple assembly is disconnected from the coupler assembly and that opens the nipple assembly to fluid flow therethrough when the nipple and coupler assemblies are fully connected; wherein the nipple assembly includes axially interfitted fitting and body parts that provide a pair of axially opposed shoulders defining a groove when the fitting and body are mated, the nipple assembly further including an axially extending hollow cylindrical probe that inserts into the coupler assembly and engages interface seal means in the coupler assembly to provide a fluidtight seal between the nipple and coupler assemblies at a predetermined point as the nipple and coupler assemblies are connected; and wherein the coupler assembly has an axial coupler probe that is sized to slidably insert into said nipple assembly probe when the nipple and coupler assemblies are made up; said integral valve and body seal having a peripheral annular body seal portion received in said nipple assembly groove and a hinged valve portion that sealingly seats against one of said shoulders in the nipple assembly adjacent said groove when the nipple and coupler assemblies are unconnected; said coupler probe displaces said valve portion as the nipple and coupler assemblies are connected; said nipple assembly probe engaging said interface seal means before said coupler probe displaces said valve portion.

10. A quick connect coupling according to claim 9 wherein said coupler assembly further includes an axially actuated valve connected to said coupler probe, said coupler valve being biased closed when the nipple and coupler assemblies are disconnected, said coupler probe engaging a stop in the nipple assembly during connection of the nipple and coupler assemblies such that further axial movement of the nipple assembly towards the coupler assembly pushes said coupler valve open after said nipple probe has sealingly engaged said interface seal means and after said coupler probe has displaced said hinged valve portion.

11. A quick connect coupling according to claim 9 wherein the coupler assembly further includes an axially actuated valve connected to said coupler probe, said coupler valve being biased closed when the nipple and coupler assemblies are disconnected, and said coupler probe engages said hinged valve portion with back pressure from fluid in the nipple assembly preventing said hinged valve portion from opening until after said coupler valve is open and said nipple probe is sealingly engaged with said coupler interface seal means.

12. A quick connect coupling according to claim 11 wherein said coupler assembly valve contacts a coupler stop in the coupler assembly at a predetermined point before the nipple and coupler assemblies are fully connected, said hinged valve portion being opened by said coupler probe after said coupler valve contacts said coupler stop.

13. An integral valve and body seal in combination with a quick connect coupling according to claim 9 wherein said peripheral annular body seal portion is an annular seal compressed at the interface of the nipple fitting and body, and said valve portion is a solid disk concentrically positioned with respect to said annular peripheral body seal and connected thereto by an elastomeric hinge.

14. An integral valve and body seal in combination with a quick connect coupling according to claim 13 wherein said hinge is a small piece of elastomeric material integrally formed with said annular seal and disk, which flexibly connects said disk with an inner portion of said annular body seal.

15. An integral valve and body seal in combination with a quick connect coupling according to claim 14 wherein said nipple body shoulder has an annular recess radially spaced from a radial inner end of said shoulder, said recess being axially opposite said nipple fitting shoulder when the nipple fitting and body are mated up; said recess being sized to receive said annular body seal and said disk being axially thinner than said annular body seal.

16. An integral valve and body seal in combination with a quick connect coupling according to claim 15 wherein said hinge is axially thinner than said disk.

17. An integral valve and body seal in combination with a quick connect coupling according to claim 16 wherein said disk includes an axially protruding rib opposite said hinge that initially contacts said coupler probe as the nipple and coupler assemblies are connected.

18. An integral valve and body seal in combination with a quick connect coupling according to claim 17 wherein said disk, annular seal and hinge are integrally formed from an injection or compression molded elastomer.

19. In combination, a quick connect coupling of the type having a nipple assembly connectable with a coupler assembly, and an integral elastomeric valve and seal device; at least one of the coupling assemblies having a pair of axially interfitted parts, one of said interfitted parts having an inward flange providing a shoulder axially spaced from an inner end of said other interfitted part when said interfitted parts are made up, and the other coupling assembly having a probe that axially approaches said flange as the nipple and coupler assemblies are connected, said integral valve and seal device having a peripheral body seal portion captured between said shoulder and said inner end when said interfitted parts are mated, and a hinged valve portion that seats against said flange when the nipple and coupler assemblies are unconnected, said hinged valve portion being displaced from said flange by said probe when the nipple and coupler assemblies are connected.

20. An integral valve and body seal according to claim 19 wherein said peripheral body seal portion is an annular seal compressed at the interface of said interfitted parts, and said valve portion is a disk concentrically positioned with respect to said annular peripheral body seal and connected thereto by a hinge.

21. An integral valve and body seal according to claim 20 wherein said hinge is a small piece of said elastomeric material, which flexibly connects said disk with said annular body seal portion, and urges said disk against said flange as a dustcover when the nipple and coupler assemblies are disconnected.

22. An integral valve and body seal according to claim 21 wherein said shoulder is an annular recess radially spaced from a radial inner end of said flange, said recess being axially opposite said inner end when said interfitted parts are mated up and being sized to receive said annular body seal, said disk being axially thinner than said annular body seal.

23. An integral valve and body seal according to claim 22 wherein said hinge is axially thinner than said disk.

24. An integral valve and body seal according to claim 20 wherein said disk includes an axially protruding rib diametrically opposite said hinge that initially contacts said probe as the nipple and coupler assemblies are connected.

25. An integral valve and body seal according to claim 20 wherein said disk provides a fluidtight seal against said flange when the one coupling assembly is unconnected from the other coupling assembly and is pressurized.

26. An integral valve and body seal according to claim 25 wherein said disk, annular seal and hinge are integrally formed molded elastomer.

27. The combination of claim 19 wherein the other coupling assembly includes a normally closed valve mechanism and means to open said normally closed valve mechanism after said hinged valve portion is displaced from said flange.

28. The combination of claim 19 wherein the other coupling assembly includes a normally closed valve mechanism and means to open said normally closed valve mechanism before said hinged valve portion is displaced from said flange.

29. The combination of claim 27 wherein said normally closed valve mechanism is a second integral valve and seal device.

30. The combination of claim 28 wherein said normally closed valve mechanism is a second integral valve and seal device.

31. The combination of claim 27 wherein said means to open said normally closed valve mechanism includes said probe.

32. The combination of claim 28 wherein said means to open said normally closed valve mechanism includes said probe.

33. The combination of claim 19 further including an interface seal in one of the coupler assemblies, said interface seal providing a fluidtight connection between the nipple and coupler assemblies as the quick connect coupling is made up and before said hinged valve portion is displaced from said flange.

* * * * *